United States Patent
Kusano et al.

(10) Patent No.: US 12,072,957 B2
(45) Date of Patent: Aug. 27, 2024

(54) DATA CLASSIFICATION SYSTEM, DATA CLASSIFICATION METHOD, AND RECORDING MEDIUM

(71) Applicant: NEC Corporation, Tokyo (JP)

(72) Inventors: Genki Kusano, Tokyo (JP); Tomoya Sakai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/925,880

(22) PCT Filed: May 28, 2020

(86) PCT No.: PCT/JP2020/021055
§ 371 (c)(1),
(2) Date: Nov. 17, 2022

(87) PCT Pub. No.: WO2021/240707
PCT Pub. Date: Dec. 2, 2021

(65) Prior Publication Data
US 2023/0195851 A1    Jun. 22, 2023

(51) Int. Cl.
*G06F 16/24* (2019.01)
*G06F 18/2431* (2023.01)

(52) U.S. Cl.
CPC ................. *G06F 18/2431* (2023.01)

(58) Field of Classification Search
CPC .................................................. G06F 18/2431
See application file for complete search history.

(56) References Cited

U.S. PATENT DOCUMENTS

| | | | |
|---|---|---|---|
| 2018/0046935 A1* | 2/2018 | Amershi | G06T 11/001 |
| 2018/0268506 A1* | 9/2018 | Wodetzki | G06N 5/046 |
| 2018/0276507 A1* | 9/2018 | Marchezi | G06N 20/00 |
| 2019/0051292 A1 | 2/2019 | Na | |
| 2020/0134083 A1* | 4/2020 | Elliman | G06F 3/0482 |
| 2020/0242398 A1 | 7/2020 | Gudovskiy et al. | |

(Continued)

FOREIGN PATENT DOCUMENTS

| | | |
|---|---|---|
| JP | 2020-042765 A | 3/2020 |
| WO | 2019/171416 A1 | 9/2019 |

OTHER PUBLICATIONS

International Search Report for PCT Application No. PCT/JP2020/021055, mailed on Sep. 1, 2020.

(Continued)

*Primary Examiner* — Mohammad S Rostami

(57) ABSTRACT

A data classification system calculates, for each known class, which is a class indicated in training data used for performing learning of class classification, a known class likelihood indicating a likelihood of target data belonging to the known class among all known classes. The data classification system selects, as candidates for a class to which the target data belongs, classes in which at least one of the known classes is excluded based on the known class likelihood among all classes in the class classification. The data classification system calculates, at least for each of the classes included in the candidates, an all-class likelihood indicating a likelihood of the target data belonging to the class among all the classes. The data classification system estimates the class to which the target data belongs as any one of the classes among the candidates, based on the all-class likelihood.

3 Claims, 8 Drawing Sheets

(56) References Cited

U.S. PATENT DOCUMENTS

| | | | | |
|---|---|---|---|---|
| 2020/0302165 A1* | 9/2020 | Dang | ................... | G06N 20/00 |
| 2020/0387675 A1* | 12/2020 | Nugent | ................... | G06F 16/35 |
| 2020/0394563 A1* | 12/2020 | Kokubo | ............. | G06F 18/2431 |
| 2021/0056364 A1 | 2/2021 | Toizumi | | |
| 2021/0133628 A1* | 5/2021 | Alvarez | ................ | G06N 20/00 |
| 2021/0166139 A1* | 6/2021 | Fujimura | ................ | G06N 7/01 |
| 2021/0203575 A1* | 7/2021 | Hanetz | ................... | H04L 63/14 |
| 2021/0350252 A1* | 11/2021 | Alexander | ............ | G06F 16/906 |
| 2022/0004919 A1* | 1/2022 | Zhang | ................... | G06N 20/00 |
| 2022/0138731 A1* | 5/2022 | Cheng | ............... | G06Q 30/0205 |
| | | | | 705/7.34 |

OTHER PUBLICATIONS

Mohammad Norouzi et al., "Zero-Shot Learning by Convex Combination of Semantic Embeddings", International Conference on Learning Representations 2014. 2014.

Abhijit Bendale et al., "Towards Open Set Deep Networks", arXiv, 2015, pp. 1-14.

Naoki Saito et al., "Category Classification of Tourism Images in Image Sharing Services", IEICE Transactions on Information and Systems (D), vol. J99-D. No. 9, pp. 848-860, 2016.

Akito Takeki et al., "Deep Meta-Recognition Networks for Open Set Recognition", Proceedings of 16th Forum on Information Technology (FIT2017), 2017, pp. 81-84.

* cited by examiner

DATA CLASSIFICATION SYSTEM, DATA CLASSIFICATION METHOD, AND RECORDING MEDIUM

This application is a National Stage Entry of PCT/JP2020/021055 filed on May 28, 2020, the contents of all of which are incorporated herein by reference, in their entirety.

TECHNICAL FIELD

The present invention relates to a data classification system, a data classification method, and a recording medium.

BACKGROUND ART

If the correct class of test data does not exist in the training data, to classify this test data into the correct class, it is necessary to classify this test data into a class that does not exist in the training data. Hereinbelow, a class that exists in the training data is called a known class, while a class that does not exist is called an unknown class.

Learning of a data classification method that also enables identification of data belonging to unknown classes is called zero shot learning. Hereinbelow, a data classification technique that enables identification of data belonging to an unknown class using zero-shot learning will be referred to as a zero-shot type data classification technique.

Among zero-shot type data classification techniques is one that reads information called attributes associated with each class, calculates the class likelihood for test data using the class attributes, and estimates the class to which the test data belongs using the calculated class likelihood.

For example, in Non-Patent Document 1, class attributes of test data are estimated, and the class likelihood is calculated using the similarity between the estimated class attributes and the attributes of each class.

Also, in Patent Document 1, using the probability that test data belongs to a known class, the class likelihood obtained by the existing zero-shot type data classification technique is corrected, and the newly obtained corrected class likelihood is used to estimate the class to which the test data belongs.

PRIOR ART DOCUMENTS

Patent Document

[Patent Document 1] PCT International Publication No. WO 2019/171416

Non-Patent Document

[Non-Patent Document 1] Mohammad Norouzi, et al., "Zero-shot learning by convex combination of semantic embeddings", International Conference on Learning Representations 2014

SUMMARY OF THE INVENTION

Problems to be Solved by the Invention

It is preferable to be able to improve the accuracy of class classification including classes not shown in the training data.

It is an object of the present invention to provide a data classification system, a data classification method, and a recording medium capable of solving the above-mentioned problems.

Means for Solving the Problems

According to the first example aspect of the present invention, a data classification system includes: a known class likelihood calculation means that, for each known class, which is a class indicated in training data used for performing learning of class classification, calculates a known class likelihood indicating a likelihood of target data belonging to the known class among all known classes; a class candidate selection means that selects, as candidates for a class to which the target data belongs, classes in which at least one of the known classes is excluded based on the known class likelihood among all classes in the class classification; an all-class likelihood calculation means that, at least for each of the classes included in the candidates, calculates an all-class likelihood indicating a likelihood of the target data belonging to the class among all the classes; and a class estimation means that estimates the class to which the target data belongs as any one of the classes among the candidates, based on the all-class likelihood.

According to the second example aspect of the present invention, a data classification method includes: calculating, for each known class, which is a class indicated in training data used for performing learning of class classification, a known class likelihood indicating a likelihood of target data belonging to the known class among all known classes; selecting, as candidates for a class to which the target data belongs, classes in which at least one of the known classes is excluded based on the known class likelihood among all classes in the class classification; calculating, at least for each of the classes included in the candidates, an all-class likelihood indicating a likelihood of the target data belonging to the class among all the classes; and estimating the class to which the target data belongs as any one of the classes among the candidates, based on the all-class likelihood.

According to the third example aspect of the present invention, a recording medium records a program for causing a computer to execute: calculating, for each known class, which is a class indicated in training data used for performing learning of class classification, a known class likelihood indicating a likelihood of target data belonging to the known class among all known classes; selecting, as candidates for a class to which the target data belongs, classes in which at least one of the known classes is excluded based on the known class likelihood among all classes in the class classification; calculating, at least for each of the classes included in the candidates, an all-class likelihood indicating a likelihood of the target data belonging to the class among all the classes; and estimating the class to which the target data belongs as any one of the classes among the candidates, based on the all-class likelihood.

Effects of the Invention

The data classification system, data classification method, and recording medium described above can improve the accuracy of class classification including classes not shown in the training data.

EXAMPLE EMBODIMENT

Example embodiments of the present invention will be described below, but the following example embodiments do not limit the invention according to the claims. Also, not all combinations of features described in the example embodiments are essential to the solution of the invention.

Hereinbelow, a class that exists in the training data is called a known class, while a class that does not exist therein is called an unknown class. It is also assumed that both the number of known classes and the number of unknown classes are finite, and test data belongs to either one of the known classes or either one of the unknown classes.

As mentioned above, known classes are classes that appear in the training data. An unknown class is a class that does not appear in training data. M known classes are denoted as $c^s_1, \ldots, c^s_M$ and N unknown classes as $c^u_1, \ldots, c^u_N$.

Also, what is here referred to as test data is data to be subject to class classification. However, the test data is not limited to data for evaluation of class classification, and may be data for class classification in actual operation. The test data is denoted as x. Moreover, the test data is also referred to as target data.

First Example Embodiment (Description of Configuration)

Figure 1:
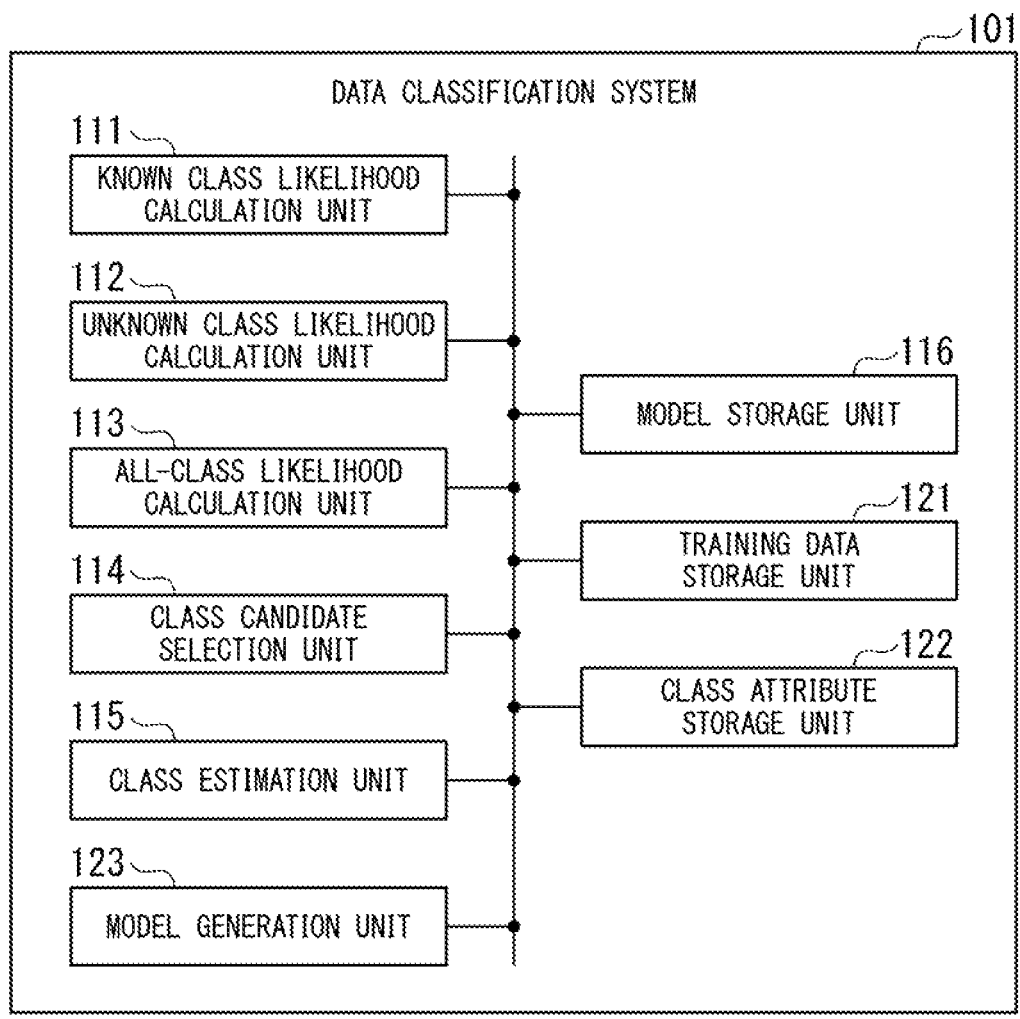
FIG. 1 is a schematic block diagram showing a configuration example of a data classification system according to the first example embodiment.

FIG. 1 is a schematic block diagram showing a configuration example of a data classification system according to the first example embodiment. With the configuration shown in FIG. 1, the data classification system 101 includes a known class likelihood calculation unit 111, an unknown class likelihood calculation unit 112, an all-class likelihood calculation unit 113, a class candidate selection unit 114, a class estimation unit 115, a model storage unit 116, a training data storage unit 121, a class attribute storage unit 122, and a model generation unit 123.

The data classification system 101 classifies test data to be classified into any of the known classes or any of the unknown classes.

The data classification system 101 may be constituted as a single device. Alternatively, the data classification system 101 may be configured as a combination of multiple devices.

The known class likelihood calculation unit 111 calculates a class likelihood in a known class of test data. Hereinbelow, the likelihood in a known class $c^s_i$ of the test data x calculated by the known class likelihood calculation unit 111 is referred to as the known class likelihood and written as $L_S(c^s_i|x)$.

The likelihood of test data x here is the probability that the test data x belongs to a certain class c when the test data x is observed, that is, p (c|x). p represents probability and p (|) represents conditional probability.

The known class likelihood is the probability that data belongs to a specific known class when a known class is set as the classification target class. That is, the known class likelihood $L_S(c^s_i|x)$ is the probability that, under the assumption that the test data x belongs to any class of all known classes, the test data x belongs to a specific known class $c^s_i$.

However, the known class likelihood does not necessarily need to satisfy the probability requirements. An index value indicating the likelihood that test data belongs to a certain known class among all known classes can be used as the known class likelihood.

Various methods can be used as the method by which the known class likelihood calculation unit 111 calculates the likelihood in a known class of test data. For example, the known class likelihood calculated by the known class likelihood calculation unit 111 may be a class likelihood calculated by a support vector machine, logistic regression, neural network, or the like. A known class likelihood based on test data obtained by a known zero-shot type data classifier may be used as the known class likelihood calculated by the known class likelihood calculation unit 111.

The known class likelihood calculation unit 111 corresponds to an example of a known class likelihood calculation means.

The unknown class likelihood calculation unit 112 calculates the class likelihood in an unknown class of test data. Hereinbelow, the likelihood in an unknown class $c^u_j$ of the test data x calculated by the unknown class likelihood calculation unit 112 is referred to as unknown class likelihood and written as $L_U(c^u_j|x)$.

The unknown class likelihood is the probability that data belongs to a specific unknown class when an unknown class is set as the classification target class. That is, the unknown class likelihood $L_U(c^u_j|x)$ is the probability that, under the assumption that the test data x belongs to any class among all unknown classes, the test data x belongs to a specific unknown class $c^u_j$.

However, an unknown class likelihood does not necessarily need to satisfy a probability requirement. An index value indicating the likelihood that test data belongs to an unknown class among all unknown classes can be used as the unknown class likelihood.

Various methods can be used as the method by which the unknown class likelihood calculation unit 112 calculates the likelihood in an unknown class of test data. For example, an unknown class likelihood based on test data obtained by a known zero-shot type data classifier may be used as the unknown class likelihood calculated by the unknown class likelihood calculation unit 112.

The unknown class likelihood calculation unit 112 corresponds to an example of an unknown class likelihood calculation means.

The all-class likelihood calculation unit 113 calculates the class likelihood in classes combining all known classes and unknown classes of test data. Hereinbelow, the likelihood of test data belonging to a class c, which is either a known class or an unknown class, calculated by the all-class likelihood calculation unit 113 is called an all-class likelihood and written as L(c|x). The entirety of classes including all known classes and all unknown classes are referred to as all classes.

The all-class likelihood is the probability that the data belongs to a specific class when all classes are made the classification target class. That is, the all-class likelihood L(c|x) is the probability that, under the assumption that the test data x belongs to any class among all classes, the test data x belongs to a specific class c.

However, the all-class likelihood does not necessarily need to satisfy the probability requirements. An index value indicating the likelihood that test data belongs to a certain class among all classes can be used as the all-class likelihood.

Various methods can be used as the method by which the all-class likelihood calculation unit 113 calculates the likelihood in all classes of test data. For example, a class likelihood based on test data obtained by a known zero-shot type data classifier may be used as the all-class likelihood calculated by the all-class likelihood calculation unit 113.

The all-class likelihood calculation unit 113 corresponds to an example of an all-class likelihood calculation means.

The class candidate selection unit 114 selects a plurality of candidates for the class related to the test data x using the known class likelihood $L_S$ ($c^s_i$|x) and the unknown class likelihood $L_U$ ($c^u_j$|x), and outputs a class candidate set including those classes. Hereinbelow, a class candidate set related to test data x is represented as $C^\wedge_x$. Here, a candidate for a class related to the data refers to, for example, a candidate for a class to which that data belongs.

Various methods can be used as the method by which the class candidate selection unit 114 selects class candidates related to the test data x. For example, the class candidate selection unit 114 may, for each of the known and unknown classes, select a predetermined number of classes in descending order of likelihood of the test data x belonging thereto. Specifically, for a predefined integer value K, the class candidate selection unit 114 selects K known classes ($c^s_{[1]}$, ..., $c^s_{[K]}$) with high known class likelihood in descending order. Further, for a predetermined integer value L, the class candidate selection unit 114 selects L unknown classes ($c^u_{[1]}$, ..., $c^u_{[L]}$) with high unknown class likelihood in descending order. Then the class candidate selection unit 114 outputs the set $C^\wedge_x = c^s_{[1]}, \ldots, c^s_{[K]}, c^{u[1]}, \ldots, c^u_{[L]}$ of (K+L) elements that combine those classes as the class candidate set $C^\wedge_x$ related to the test data x.

Alternatively, for example, the class candidate selection unit 114 may select classes whose likelihood is equal to or greater than a predetermined value for each known class and unknown class. Specifically, class candidate selection unit 114 selects a known class whose known class likelihood $L_S$ ($c^s_i$|x) is greater than or equal to θ for a predetermined real value θ. Also, the class candidate selection unit 114 selects an unknown class whose unknown class likelihood $L_U$ ($c^u_j$|x) is greater than or equal to η for a predetermined real value η. Then, the class candidate selection unit 114 outputs a set of these classes as the class candidate set $C^\wedge_x$ related to the test data x.

The class candidate selection unit 114 corresponds to an example of a class candidate selection means.

The class estimation unit 115 uses the all-class likelihood calculation unit 113 to calculate the likelihood of each class in the class candidate set $C^\wedge_x$ related to the test data x obtained by the class candidate selection unit 114. Then, the class estimation unit 115 estimates the class that returns the highest likelihood among $C^\wedge_x$ as the class to which the test data x belongs.

The class estimation unit 115 corresponds to an example of class estimation means.

The all-class likelihood calculation unit 113 calculates the all-class likelihood for at least each class included in the class candidate set so that the class estimation unit 115 can estimate the class to which the test data belongs using the all-class likelihood. The all-class likelihood calculation unit 113 may calculate the all-class likelihood for all known classes and all unknown classes.

The model storage unit 116 stores learned likelihood calculation models used by the known class likelihood calculation unit 111, the unknown class likelihood calculation unit 112, and the all-class likelihood calculation unit 113, respectively.

The training data storage unit 121 stores training data. The training data stored in the training data storage unit 121 is configured as a set of pairs of data that can be used as training data and the class to which that data belongs. All the data here belong to known classes, and so the training data does not include data belonging to unknown classes.

The class attribute storage unit 122 stores the class attributes of all classes combining known classes and unknown classes.

For example, a class attributes may be represented by a multi-dimensional numerical vector containing integer-value elements, real-value elements, or both.

Alternatively, the class attributes may be a collection of multiple tags representing character strings indicating the class name, comments, and the like, and the class.

When the model storage unit 116 does not have a learned likelihood calculation model used in each likelihood calculation unit, the model generation unit 123 generates each likelihood calculation model by learning using the training data stored by the training data storage unit 121 and the class attributes stored by the class attribute storage unit 122.

When a zero-shot type data classifier is used for the likelihood calculation model, the model generation unit 123 may generate a learned zero-shot type data classifier using the training data obtained by the training data storage unit 121 and the class attributes obtained by the class attribute storage unit 122.

In the known class likelihood calculation unit 111, when a method used in supervised learning such as a support vector machine, logistic regression, or a neural network is used for learning the likelihood calculation model, the model generation unit 123 may generate a learned likelihood calculation model that calculates the known class likelihood using the training data obtained by the training data storage unit 121.

(Description of Operation)

Next, the operation of the data classification system 101 will be explained using FIGS. 2 and 3.

Figure 2:
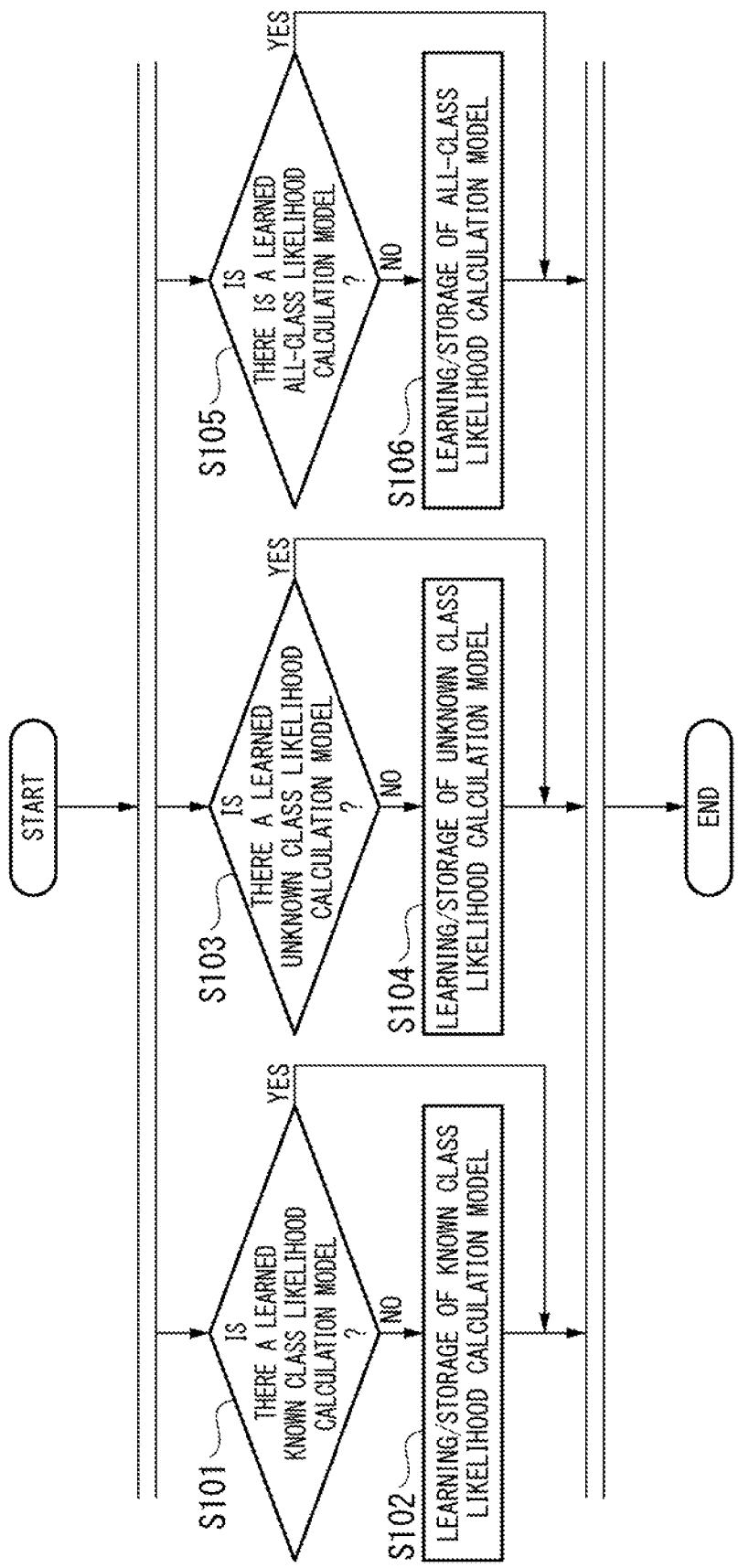
FIG. 2 is a flowchart showing an operation example during learning in the data classification system according to the first example embodiment.

FIG. 2 is a flowchart showing an operation example during learning in the data classification system 101.

In the processing of FIG. 2, the model generation unit 123 determines whether or not the model storage unit 116 holds a learned known class likelihood calculation model (Step S101). If it is determined that it holds a learned known class likelihood calculation model (Step S101: YES), the data classification system 101 ends the group of processes of steps S101 and S102.

On the other hand, when it is determined that it holds no learned known class likelihood calculation model (Step S101: NO), the model generation unit 123 generates a known class likelihood calculation model using training data and class attributes, and stores the model in the model storage unit 116 (Step S102). After Step S102, the data classification system 101 ends the group of processes of steps S101 and S102.

The model generation unit 123 also determines whether or not the model storage unit 116 holds a learned unknown class likelihood calculation model (Step S103). If it is determined that it holds a learned unknown class likelihood calculation model (Step S103: YES), the data classification system 101 ends the group of processes of steps S103 and S104.

On the other hand, if it is determined that it holds no learned unknown class likelihood calculation model (Step S103: NO), the model generation unit 123 generates an unknown class likelihood calculation model using training data and class attributes, and stores the model in the model storage unit 116 (Step S104). After Step S104, the data classification system 101 ends the group of processes of steps S103 and S104.

In addition, the model generation unit 123 determines whether or not the model storage unit 116 holds a learned all-class likelihood calculation model (Step S105). If it is determined that it holds a learned all-class likelihood calculation model (Step S105: YES), the data classification system 101 ends the group of processes of steps S105 and S106.

On the other hand, if it is determined that it holds no learned all-class likelihood calculation model (Step S105: NO), the model generation unit 123 generates an all-class likelihood calculation model using training data and class attributes, and stores the model in the model storage unit 116 (Step S106). After Step S106, the data classification system 101 ends the group of processes of steps S105 and S106.

The group of processes in steps S101 and S102, the group of processes in steps S103 and S104, and the group of processes in steps S105 and S106 can be executed in parallel. The model generation unit 123 may execute these processes in parallel.

When the group of processes of steps S101 and S102, the group of processes of steps S103 and S104, and the group of processes of steps S105 and S106 are finished, the data classification system 101 ends the processing of FIG. 2.

Figure 3:
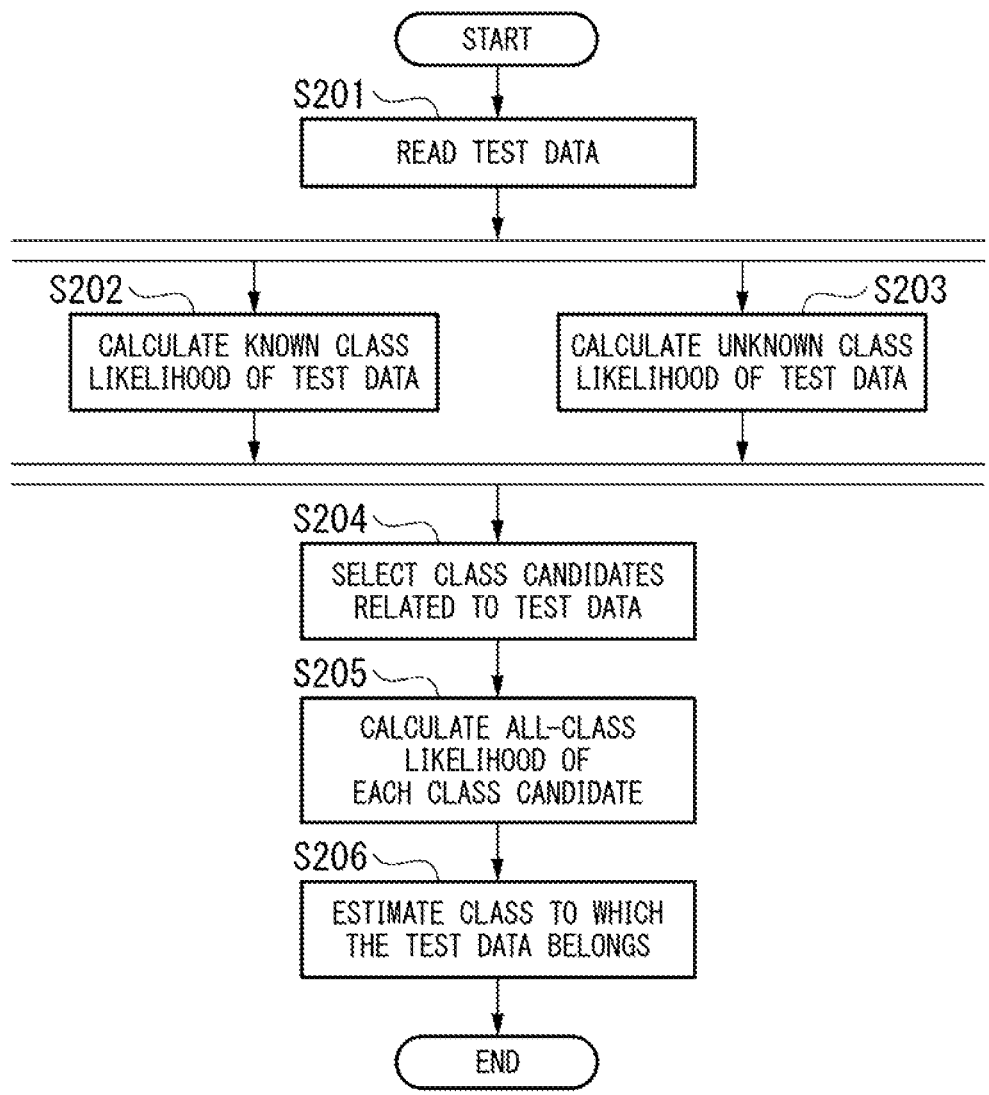
FIG. 3 is a flowchart showing an operation example during inference when the data classification system according to the first example embodiment classifies test data.

FIG. 3 is a flowchart showing an operation example during inference when the data classification system 101 classifies test data.

First, the data classification system 101 reads test data (Step S201).

Next, the known class likelihood calculation unit 111, which has read the learned known class likelihood calculation model from the model storage unit 116, calculates the known class likelihood of the input test data (Step S202).

The unknown class likelihood calculation unit 112, which has read the learned unknown class likelihood calculation model from the model storage unit 116, calculates the unknown class likelihood of the input test data (Step S203). The process of Step S202 and the process of Step S203 can be executed in parallel.

After steps S202 and S203, the class candidate selection unit 114 selects class candidates related to the test data using the known class likelihood of the test data and the unknown class likelihood of the test data (Step S204).

Next, the all-class likelihood calculation unit 113, which has read the learned all-class likelihood calculation model from the model storage unit 116, calculates the all-class likelihood of each of the class candidates obtained in Step S204 (Step S205).

Next, the class estimation unit 115 estimates the class to which the test data belongs using the all-class likelihood obtained in Step S205 (Step S206).

After Step S206, the data classification system 101 ends the processing of FIG. 3.

(Description of Effects)

Next, the effects of the first example embodiment will be described.

In the first example embodiment, the classification target class number of the class estimation unit 115 is reduced due to the class selection by the class candidate selection unit 114. Classes selected by the class candidate selection unit 114 are limited to those for which the known class likelihood calculation unit 111 and the unknown class likelihood calculation unit 112 assign a high class likelihood. That is, the classes selected by the class candidate selection unit 114 are classes highly related to the correct class of the test data.

By thus limiting the classes to be estimated by the class estimation unit 115 to those classes selected by the class candidate selection unit 114, it is expected that the accuracy of class classification will be improved.

As described above, the known class likelihood calculation unit 111 calculates, for each known class, which is a class indicated in training data used for performing learning of class classification, a known class likelihood indicating a likelihood of target data belonging to the known class among all known classes. The class candidate selection unit 114 selects, as candidates for the class to which the target data belongs, classes excluding at least one known class on the basis of the known class likelihood, among all classes in the class classification. The all-class likelihood calculation unit 113 calculates, at least for each of the classes included in the candidates for the class to which the target data belongs, an all-class likelihood indicating a likelihood of the target data belonging to the class of all the classes. The class estimation unit 115 estimates the class to which the target data belongs, as any of the classes among the candidates for the class to which the target data belongs, on the basis of the all-class likelihood.

In this way, it is expected that the data classification system 101 can perform class classification with relatively high accuracy by the class candidate selection unit 114 narrowing down the candidates for the class to which the target data belongs on the basis of the known class likelihood.

For example, consider a case where, among known classes, the class with the highest known class likelihood differs from the class with the highest all-class likelihood, and the known class likelihood of the class with the highest all-class likelihood is relatively low.

In this way, when a discrepancy arises between the known class likelihood and the all-class likelihood, the known class likelihood calculation model is expected to be more accurate in model learning than the all-class likelihood calculation model in terms of classifying into classes that appear in the training data. Based on this, under the assumption that the correct class to which the target data belongs is one of the known classes, class estimation using the known class likelihood is expected to be more accurate than class estimation using the all-class likelihood.

If the class estimation unit 115 estimates a known class with the highest all-class likelihood as being the class to which the target data belongs, it is highly likely that the estimation result is incorrect because the known class likelihood of the estimated class is relatively low.

In contrast, due to the known class likelihood of a known class with the highest all-class likelihood being relatively low, the class candidate selection unit 114 is expected to exclude this known class from the candidates for the class to which the target class belongs. As a result of the class candidate selection unit 114 excluding this known class, the class estimation unit 115 will not estimate this known class as the class to which the target data belongs. This is expected to avoid erroneous estimation.

Thus, according to the data classification system 101, it is possible to improve the accuracy of class classification including unknown classes, which are classes not indicated in the training data.

For each unknown class, which is a class other than a known class, the unknown class likelihood calculation unit 112 calculates an unknown class likelihood that indicates the likelihood that the target data belongs to that unknown class among all the unknown classes. The class candidate selection unit 114 selects candidates for the class to which the target data belongs using the known class likelihood and the unknown class likelihood.

As a result, even when the class estimation unit 115 estimates the class to which the target data belongs to be one of the unknown classes, it is expected that the estimation accuracy is high. Specifically, the unknown class estimated by the class estimation unit 115 is a class with relatively high unknown class likelihood and all-class likelihood. In this respect, the estimation result of the class estimation unit 115 can be interpreted as receiving a relatively high evaluation in any of the plurality of evaluation methods, and so high estimation accuracy is expected.

The class candidate selection unit 114 selects a predetermined number of known classes in descending order of the known class likelihood of the target data and a predetermined number of unknown classes in descending order of the unknown class likelihood of the target data as candidates for the class to which the target data belongs.

As a result, the class candidate selection unit 114 can perform candidate selection by a relatively simple process of ranking the known classes and the unknown classes in descending order of likelihood and selecting only a predetermined number of candidates, which requires a relatively light processing load.

Further, the class candidate selection unit 114 selects a class among the known classes for which the known class likelihood of the target data is higher than a predetermined threshold, and a class among the unknown classes for which the unknown class likelihood of the target data is higher than a predetermined threshold, as candidates for the class to which the target data belongs.

As a result, the class candidate selection unit 114 can select candidates by a relatively simple process of comparing the likelihood with a threshold value for each of the known class and the unknown class, which requires a relatively light processing load.

Second Example Embodiment (Description of Configuration)

Figure 4:
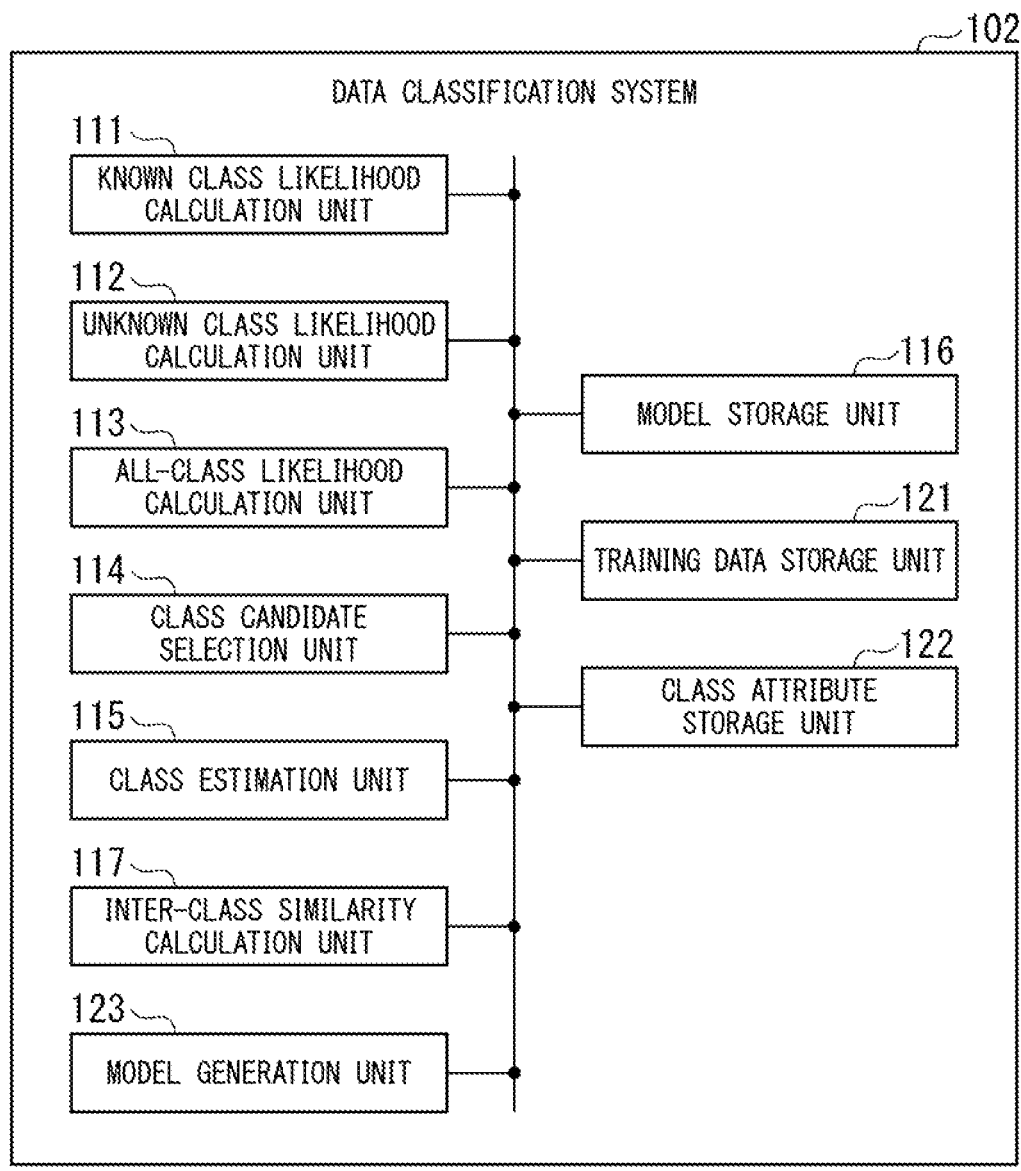
FIG. 4 is a schematic block diagram showing a configuration example of a data classification system according to the second example embodiment.

FIG. 4 is a schematic block diagram showing a configuration example of a data classification system according to the second example embodiment. With the configuration shown in FIG. 4, a data classification system 102 includes a known class likelihood calculation unit 111, an unknown class likelihood calculation unit 112, an all-class likelihood calculation unit 113, a class candidate selection unit 114, a class estimation unit 115, a model storage unit 116, an inter-class similarity calculation unit 117, a training data storage unit 121, a class attribute storage unit 122, and a model generation unit 123.

Of the parts of the data classification system 102, the same parts as those of the data classification system 101 (FIG. 1) are denoted by the same reference numerals as those of FIG. 1, and so detailed description thereof will be omitted.

The difference between the data classification system 102 according to the second example embodiment and the first example embodiment is that the data classification system 102 includes the inter-class similarity calculation unit 117.

Also, in the second example embodiment, the specific method by which the unknown class likelihood calculation unit 112 calculates the unknown class likelihood differs from that in the first example embodiment. In addition, the model storage unit 116 of the second example embodiment does not need to store an unknown class likelihood calculation model.

The inter-class similarity calculation unit 117 calculates the similarity between two classes.

For example, the inter-class similarity calculation unit 117 reads class attributes from the class attribute storage unit 122 for each of two classes. Then, the inter-class similarity calculation unit 117 calculates an output value (similarity function value) by inputting the class attributes of the two classes into a similarity function. When the value range of the similarity function includes only non-negative real numbers, the inter-class similarity calculation unit 117 uses the output value of the similarity function as the similarity between two classes. On the other hand, when the value range of the similarity function includes negative real values, the inter-class similarity calculation unit 117 uses as the similarity between the two classes a value obtained by applying a transformation to the output value of the similarity function that always results in a non-negative real value.

Various functions can be used as the similarity function used by the inter-class similarity calculation unit 117.

For example, if the class attribute is a multidimensional numerical vector, the inter-class similarity calculation unit 117 may use cosine similarity, a Gaussian function, or the like as the similarity function.

For example, when the class attribute is a character string, the inter-class similarity calculation unit 117 may use the Levenshtein distance, the Jaro-Winkler distance, or the like as the similarity function. Further, when the class attribute is a set, the inter-class similarity calculation unit 117 may use the Jaccard similarity, the Simpson coefficient, or the like as the similarity function.

The inter-class similarity calculation unit 117 corresponds to an example of an inter-class similarity calculation means.

As described above, when the similarity function value can take a negative real value, the inter-class similarity calculation unit 117 applies a transformation to the similarity function value that always results in a non-negative real value. Various methods can be used for this conversion.

For example, a transformation such that the similarity function value is always converted to a non-negative real value may be a transformation that subtracts an offset corresponding to the minimum value of the similarity function from the similarity function value. If the minimum value of the similarity function is negative, subtracting the offset corresponding to the minimum value of the similarity function involves adding a positive value corresponding to the absolute value of the minimum value of the similarity function.

Alternatively, a transformation such that the similarity function value is always converted to a non-negative real number may be a transformation that calculates the similarity function power of Napier's constant.

In the following description, the class attribute of a class c stored in the class attribute storage unit 122 is represented as $a_c$. Also, the similarity between two classes c and c' obtained by the inter-class similarity calculation unit 117 is expressed as $sim(a_c, a_{c'})$. The unknown class likelihood calculation unit 112 may calculate the unknown class likelihood $L_U(c^u_j|x)$ in an unknown class $c^u_j$ of the test data x as shown in Equation (1) below.

[Equation 1]

$$L_U(c^u_j | x) = \sum_{i=1}^{M} sim(a_{c^u_j}, a_{c^s_i}) L_s(c^s_i | x) \quad (1)$$

In addition, instead of summing over all known classes in Equation (1), a sum may be calculated over a plurality of classes $c^s_{[1]}, \ldots, c^s_{[K]}$ selected from all known classes $c^s_i, \ldots, c^s_M$. In this case, the unknown class likelihood calculation unit 112 may calculate the unknown class likelihood $L_U(c^u_j|x)$ in the unknown class $c^u_j$ of the test data x as shown in Equation (2) below.

[Equation 2]

$$L_U(c^u_j | x) = \sum_{k=1}^{K} sim(a_{c^u_j}, a_{c^s_{[k]}}) L_s(c^s_{[k]} | x) \quad (2)$$

Various means can be used to select multiple classes $c^s_{[1]}, \ldots, c^s_{[K]}$ from among all known classes.

For example, a method may be adopted that, for a predetermined integer value K described in the first example embodiment, selects K classes $c^s_{[1]}, \ldots, c^s_{[K]}$ with high known class likelihood in descending order from the top.

The class candidate selection unit 114 may select a plurality of classes $c^s_{[1]}, \ldots, c^s_{[K]}$ from all known classes. Alternatively, the unknown class likelihood calculation unit 112 may make this selection. Alternatively, the inter-class similarity calculation unit 117 may make this selection.

(Description of Operation)

Next, the operation of the data classification system 102 will be explained using FIGS. 5 and 6.

Figure 5:
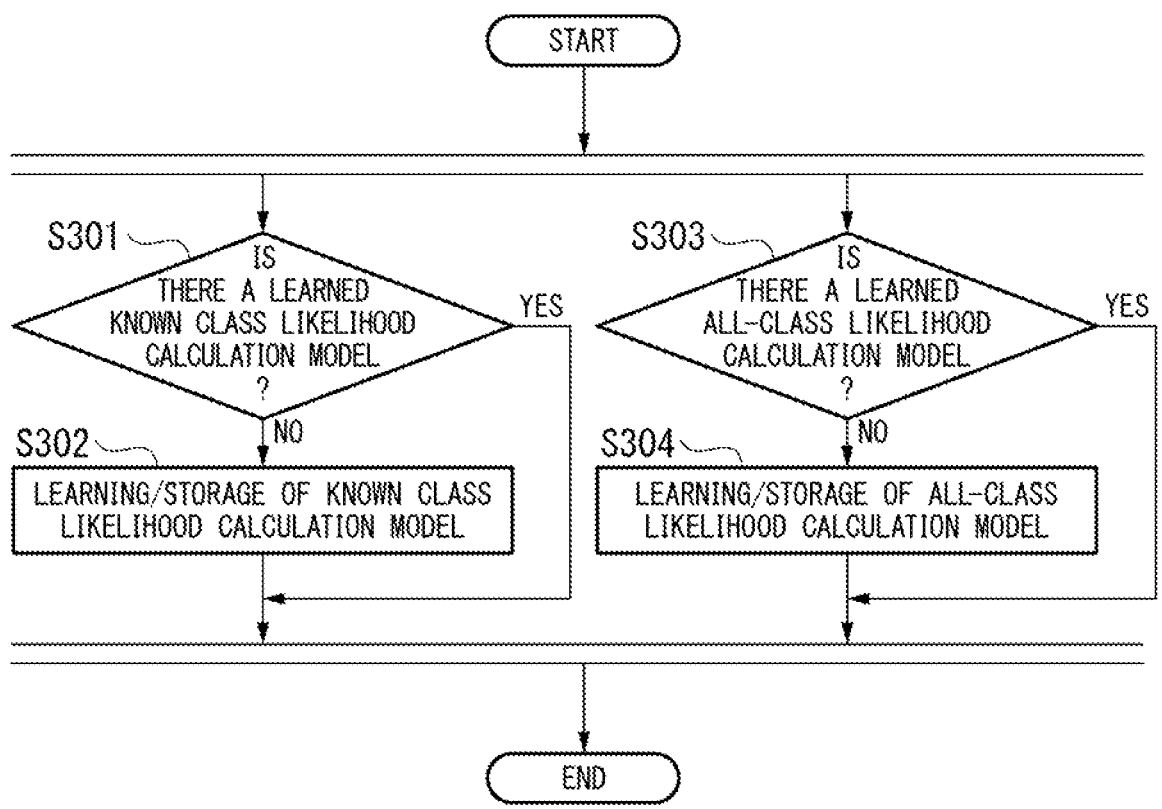
FIG. 5 is a flowchart showing an operation example during learning in the data classification system according to the second example embodiment.

FIG. 5 is a flowchart showing an operation example during learning in the data classification system 102.

In the processing of FIG. 5, the model generation unit 123 determines whether or not the model storage unit 116 holds a learned known class likelihood calculation model (Step S301). If it is determined that it holds a learned known class likelihood calculation model (Step S301: YES), the data classification system 102 ends the group of processes of steps S301 and S302.

On the other hand, if it is determined that it holds no learned known class likelihood calculation model (Step S301: NO), the model generation unit 123 generates a known class likelihood calculation model using training data and class attributes, and stores the model in the model storage unit 116 (Step S302). After Step S302, the data classification system 102 ends the group of processes of steps S301 and S302.

In addition, the model generation unit 123 determines whether or not the model storage unit 116 holds a learned all-class likelihood calculation model (Step S303). If it is determined that it holds a learned all-class likelihood calculation model (Step S303: YES), the data classification system 102 ends the group of processes of steps S303 and S304.

On the other hand, if it is determined that it holds no learned all-class likelihood calculation model (Step S303: NO), the model generation unit 123 generates an all-class likelihood calculation model using the training data and class attributes, and stores the model in the model storage unit 116 (Step S304). After Step S304, the data classification system 102 ends the group of processes of steps S303 and S304.

The group of processes in steps S301 and S302 and the group of processes in steps S303 and S304 can be executed in parallel. The model generation unit 123 may also execute these processes in parallel.

When the group of processes of steps S301 and S302 and the group of processes of steps S303 and S304 are finished, the data classification system 101 ends the processing of FIG. 5.

Figure 6:
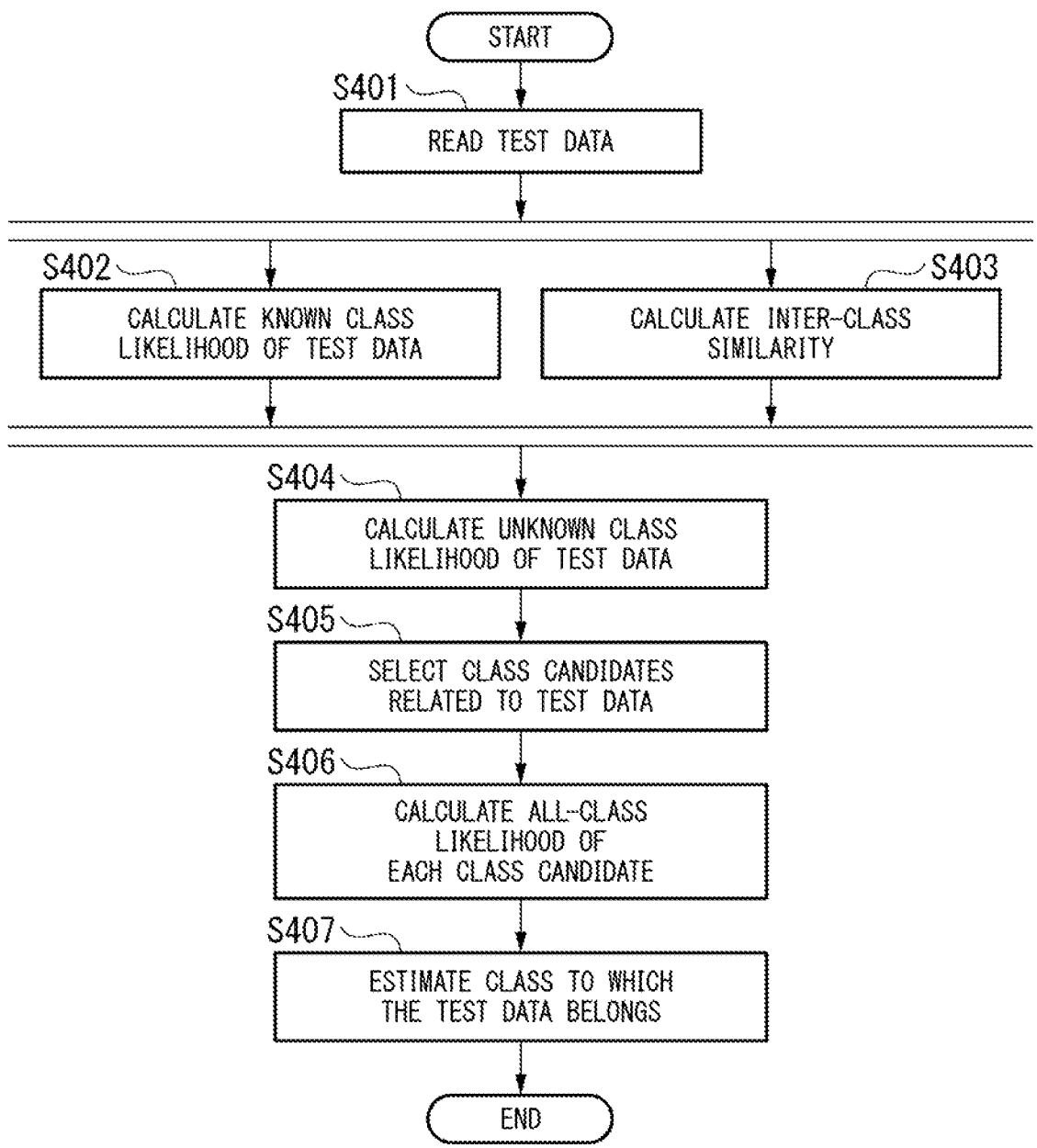
FIG. 6 is a flowchart showing an operation example during inference in the data classification system according to the second example embodiment.

FIG. 6 is a flowchart showing an operation example during inference when the data classification system 102 classifies test data.

First, the data classification system 102 reads the test data (Step S401).

Next, the known class likelihood calculation unit 111, which has read the learned known class likelihood calculation model from the model storage unit 116, calculates the known class likelihood of the input test data (Step S402).

Also, the inter-class similarity calculation unit 117 calculates the similarity between a known class and an unknown class using the class attributes obtained from the class attribute storage unit 122 (Step S403). The process of Step S402 and the process of Step S403 can be executed in parallel.

After steps S402 and S403, the unknown class likelihood calculation unit 112 calculates the unknown class likelihood of the input test data using the known class likelihood and inter-class similarity (Step S404).

Next, the class candidate selection unit 114 selects class candidates related to the test data using the known class likelihood of the test data and the unknown class likelihood of the test data (Step S405).

Next, the all-class likelihood calculation unit 113, which has read the learned all-class likelihood calculation model from the model storage unit 116, calculates the all-class likelihood of each of the class candidates obtained in Step S405 (Step S406).

Next, the class estimation unit 115 estimates the class to which the test data belongs using the all-class likelihood obtained in Step S406 (Step S407).

After Step S407, the data classification system 102 ends the processing of FIG. 6.

(Description of Effects)

Next, the effects of this example embodiment will be described.

In the second example embodiment, the unknown class selected by the class candidate selection unit 114 has high similarity to a known class with a high known class likelihood. In general, when the test data belongs to a known class, a classifier using the known class likelihood calculation unit 111 rather than the all-class likelihood calculation unit 113 is expected to be more accurate in learning in terms of classifying to classes that appear in the training data, and in this respect, the classification accuracy is higher. Therefore, known classes with a high known class likelihood are likely to have high similarity with the correct class in the test data, and the likelihood of unknown classes with a high similarity to the correct class of the test data is also high, thus improving the classification accuracy of the zero-shot type data classification technique.

As described above, the inter-class similarity calculation unit 117 calculates the similarity between two classes. The unknown class likelihood calculation unit 112 calculates the unknown class likelihood of test data using the known class likelihood and the class similarity.

Since the known class is a class that appears in the training data, it is expected that the learning accuracy of the known class likelihood calculation model is high and the accuracy of the known class likelihood is high. The unknown class likelihood is expected to be highly accurate because the unknown class likelihood calculation unit 112 calculates the unknown class likelihood using the highly accurate known class likelihood.

Third Example Embodiment

In the third example embodiment, a more specific example of processing performed by the data classification system 102 according to the second example embodiment will be described.

As an example, in an image classification task, the case will be considered of correctly estimating the class of a test image that belongs to a class that is not included in an image database as training data. The case to be considered in one in which the class of the test image belongs to the "fennec fox" class, which is not in the image database.

First, the known class likelihood calculation unit 111 selects a class to which the known class likelihood calculation unit gives a high likelihood from among the classes existing in the image database with respect to the test image. Let the test image be x, and assuming that the known classes subject to this classification are "Ezo red fox, Shiba Inu, calico cat, horse", assume the known class likelihood calculation unit 111 calculates $L_S$ (Ezo red fox|x)=0.5, $L_S$ (Shiba Inu|x)=0.3, $L_S$ (calico cat|x)=0.1, and $L_S$ (horse|x) =0.1.

Assume that the class candidate selection unit 114 selects classes having a likelihood equal to or higher than a predefined threshold of 0.25 from the known classes. In this case, the class candidate selection unit 114 selects "Ezo red fox, Shiba Inu" from the known classes.

Next, the class candidate selection unit 114 selects a class to which the unknown class likelihood calculation unit gives a high likelihood from among the classes that do not exist in the image database. Consider, for example, the case that the unknown classes subject to this classification are "fennec fox, Japanese wolf, Persian cat", and the unknown class likelihood calculation unit 112 calculates $L_U$ (fennec fox|x) =0.6, $L_U$ (Japanese wolf|x)=0.3, $L_U$(Persian cat|x)=0.1.

Assume that the class candidate selection unit 114 selects classes having a likelihood equal to or higher than a predefined threshold of 0.3 among the unknown classes. In this case, the class candidate selection unit 114 selects "fennec fox, Japanese wolf" from among the unknown classes.

When the unknown class likelihood calculation unit 112 in the second example embodiment calculates the unknown class likelihood $L_U$, the inter-class similarity calculation unit 117 calculates the interclass similarity using class attributes obtained from the attribute database.

If the fennec fox is of the order Carnivora, Canidae, Vulpes, non-avian, large-eared, brown animal, then the class attributes of the fennec fox may be defined as $a_{fennec}$=(1, 1, 1, 0, 1, 1), which is a vector expressed using 0 and 1.

The class candidate selection unit 114 makes the set of the selected known classes and the selected unknown classes the class candidate set $C\hat{\varphi}_x$ for the test image x. Here, the class candidate selection unit 114 sets the set {Ezo red fox, Shiba Inu, fennec fox, Japanese wolf} of the selected known classes "Ezo red fox" and "Shiba Inu" and the selected unknown classes "fennec fox" and "Japanese wolf" as the class candidate set $C\hat{\varphi}_x$ for the test image.

The all-class likelihood calculation unit 113 calculates the all-class likelihood of each class included in the class candidate set $C\hat{\varphi}_x$. The all-class likelihood calculation unit 113 may calculate the all-class likelihood using a known zero-shot type data classification technique.

The class estimation unit 115 uses the all-class likelihood calculated by the all-class likelihood calculation unit 113 to estimate the class to which the test image x belongs.

For example, consider the case where arranging the classes in the class candidate set $C\hat{\varphi}_x$ in descending order of all-class likelihood results in the order of "fennec fox", "Ezo red fox", "Shiba Inu", and "Japanese wolf". In this case, the class estimation unit 115 outputs the class "fennec fox" having the highest all-class likelihood as the estimated class to which the test image x belongs.

Also, in the example of the fennec fox test image above, consider the case where use of the zero-shot type data classification technique results in the class likelihood of "Persian cat" being the highest among all classes. In this case, a classifier based on a known zero-shot type data classification technique would output "Persian cat" as the estimated class to which the test image belongs. The classifier would then misclassify the "fennec fox" image as a "Persian cat" image.

On the other hand, in the classification performed by the data classification system 102, if the Persian cat is of the order Carnivora, is not of the Canidae family, is not of the genus *Vulpes*, is not a bird, is not large-eared, and is not a brown animal, then the class attribute of the Persian cat becomes $a_{Persian\ cat}$=(1, 0, 0, 0, 0, 0). Therefore, the inter-class similarities between each of the canines "Ezo red fox, Shiba Inu" and the Persian cat calculated by the inter-class similarity calculation unit 117 are low. This reduces the possibility of the unknown class likelihood calculation unit 112 assigning a high-class likelihood to Persian cat, and so the class candidate selection unit 114 does not include "Persian cat" in the class candidate set. In the data classification system 102 according to the second example embodiment, misclassification can be avoided by excluding "Persian cat", which has low similarity to the canid "fennec fox", from the class candidate set, thereby improving the classification accuracy.

According to the data classification system 101 of the first example embodiment and the data classification system 102 of the second example embodiment, additionally in sentence classification that classifies sentences into categories in which they belong, it is expected that the category of sentences belonging to categories not included in a sentence database can be correctly estimated. For example, in response to a comment on a product posted on a SNS (Social Networking Service) and the like, if the product name referred to by the comment is a product, such as a new product, that does not yet exist in the sentence database, the case will be considered of correctly estimating the name of the product to which the comment refers. In this case, by replacing the image in the aforementioned image classification task with a comment, the class to which the image belongs with a product name, and the class attribute of the image with a class attribute of the product determined from the product genre, ingredients, and the like, the same procedure as described above can be used to estimate the name of the product to which the comment refers with a high degree of accuracy.

Fourth Example Embodiment

Figure 7:
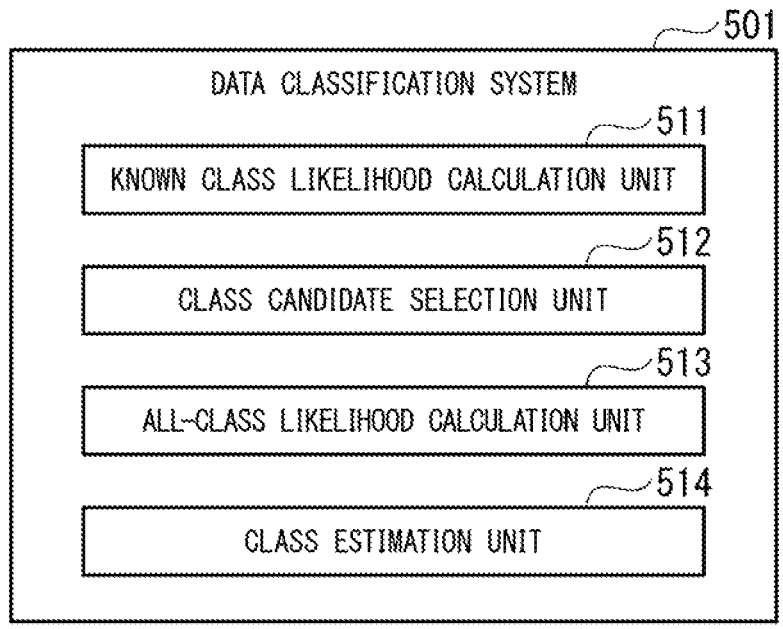
FIG. 7 is a diagram showing a configuration example of a data classification system according to the fourth example embodiment.

FIG. 7 is a diagram showing a configuration example of a data classification system according to the fourth example embodiment. With the configuration shown in FIG. 7, a data classification system 501 is provided with a known class likelihood calculation unit 511, a class candidate selection unit 512, an all-class likelihood calculation unit 513, and a class estimation unit 514.

With such a configuration, the known class likelihood calculation unit 511 calculates, for each known class, which is a class indicated in training data used for performing learning of class classification, a known class likelihood indicating a likelihood of target data belonging to the known class among all known classes. The class candidate selection unit 512 selects, as candidates for the class to which the target data belongs to, classes excluding at least one known class on the basis of the known class likelihood, among all classes in the class classification. The all-class likelihood calculation unit 513 calculates, at least for each of the classes included in the candidates for the class to which the target data belongs, an all-class likelihood indicating a likelihood of the target data belonging to the class of all the classes. The class estimation unit 514 estimates the class to which the target data belongs as any of the classes among the candidates for the class to which the target data belongs, on the basis of the all-class likelihood.

In this way, it is expected that the data classification system 501 can perform class classification with relatively high accuracy by the class candidate selection unit 512 narrowing down the candidates for the class to which the target data belongs on the basis of the known class likelihood. In this respect, the data classification system 501 can improve the accuracy of class classification including classes not shown in the training data.

Fifth Example Embodiment

Figure 8:
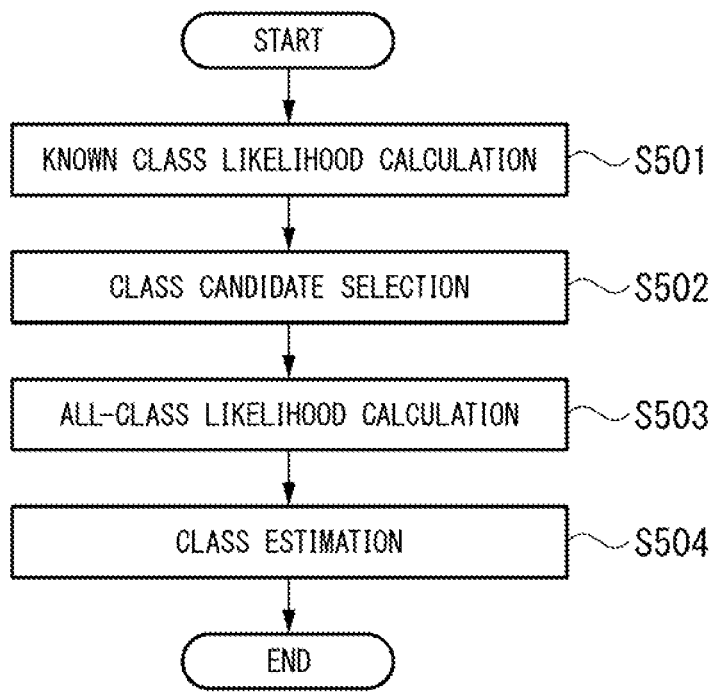
FIG. 8 is a diagram showing an example of a processing procedure in a determination method according to the fifth example embodiment.

FIG. 8 is a diagram showing an example of a processing procedure in a data classification method according to the fifth example embodiment.

The data classification method shown in FIG. 8 includes a known class likelihood calculation step (Step S501), a class candidate selection step (Step S502), an all-class likelihood calculation step (step S503), and a class estimation step (Step S504).

In the known class likelihood calculation step (Step S501), for each of known classes which are indicated in training data used for performing learning of class classification, a known class likelihood indicating a likelihood of target data belonging to the known class among all known classes is calculated.

In the class candidate selection step (Step S502), classes excluding at least one known class on the basis of the known class likelihood, among all classes in the class classification, are selected as candidates for the class to which the target data belongs.

In the all-class likelihood calculation step (Step S503), at least for each class included in the candidates for the class to which the target data belongs, an all-class likelihood indicating the likelihood of the target data belonging to the class among all the classes is calculated.

In the class estimation step (Step S504), the class to which the target data belongs is estimated as any of the classes among the candidates for the class in which the target data belongs on the basis of the all-class likelihood.

According to the data classification method shown in FIG. 8, it is expected that class classification can be performed with relatively high accuracy by narrowing down the candidates for the class to which the target data belongs on the basis of the known class likelihood. According to the data classification method shown in FIG. 8, in this respect, it is possible to improve the accuracy of class classification including classes not shown in the training data.

Figure 9:
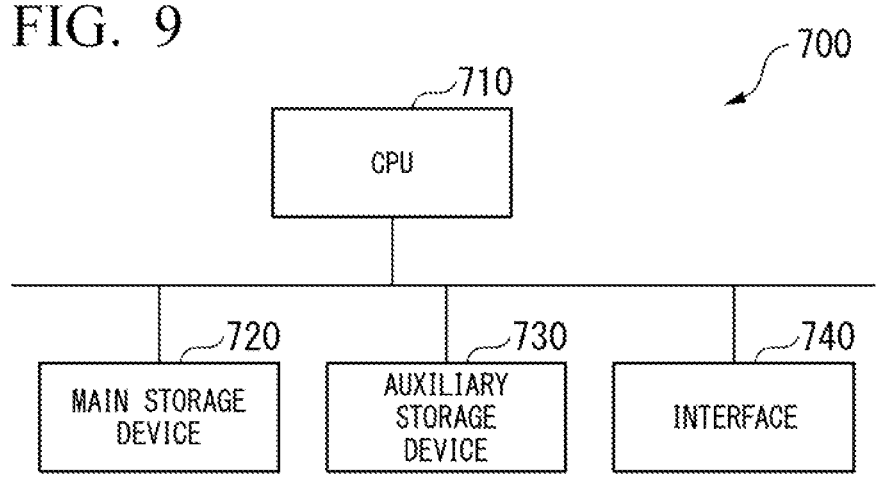
FIG. 9 is a schematic block diagram showing the configuration of a computer according to at least one example embodiment.

FIG. 9 is a schematic block diagram showing the configuration of a computer according to at least one example embodiment.

With the configuration shown in FIG. 9, the computer 700 includes a CPU 710, a main storage device 720, an auxiliary storage device 730, and an interface 740.

Any one or more of the data classification system 101, the data classification system 102 and the data classification system 501 described above may be implemented in the computer 700. In that case, the operation of each processing unit described above is stored in the auxiliary storage device 730 in the form of a program. The CPU 710 reads out the program from the auxiliary storage device 730, deploys the program in the main storage device 720, and executes the above processing according to the program. In addition, the CPU 710 secures storage areas corresponding to the storage units described above in the main storage device 720 according to the program. Communication between each device and another device is performed by the interface 740 having a communication function and performing communication under the control of the CPU 710.

When data classification system 101 is implemented in the computer 700, the operations of the known class likelihood calculation unit 111, the unknown class likelihood calculation unit 112, the all-class likelihood calculation unit 113, the class candidate selection unit 114, the class estimation unit 115, and the model generation unit 123 are stored in the auxiliary storage device 730 in the form of a program. The CPU 710 reads out the program from the auxiliary storage device 730, deploys the program in the main storage device 720, and executes the above processing according to the program.

In addition, the CPU 710 secures storage areas corresponding to the model storage unit 116, the training data storage unit 121, and the class attribute storage unit 122 in the main storage device 720 according to the program.

When data classification system 102 is implemented in the computer 700, the operations of the known class likelihood calculation unit 111, the unknown class likelihood calculation unit 112, the all-class likelihood calculation unit 113, the class candidate selection unit 114, the class estimation unit 115, the inter-class similarity calculation unit 117, and the model generation unit 123 are stored in the auxiliary storage device 730 in the form of a program. The CPU 710 reads out the program from the auxiliary storage device 730, deploys the program in the main storage device 720, and executes the above processing according to the program.

In addition, the CPU 710 secures storage areas corresponding to the model storage unit 116, the training data storage unit 121, and the class attribute storage unit 122 in the main storage device 720 according to the program.

When data classification system 501 is implemented in the computer 700, the operations of the known class likelihood calculation unit 511, the class candidate selection unit 512, the all-class likelihood calculation unit 513, and the class estimation unit 514 are stored in the auxiliary storage device 730 in the form of a program. The CPU 710 reads out the program from the auxiliary storage device 730, deploys the program it in the main storage device 720, and executes the above processing according to the program.

A program for executing all or part of the processing performed by the determination device 100 and the determination device 210 may be recorded on a computer-readable recording medium, and the program recorded on this recording medium may be read into a computer system, whereby the processing of each unit may be performed. It should be noted that the "computer system" referred to here includes an OS and hardware such as peripheral devices.

In addition, "computer-readable recording medium" means portable media such as flexible discs, magneto-optical discs, ROM (Read Only Memory), CD-ROM (Compact Disc Read Only Memory), and storage devices such as hard disks built into computer systems. The program may be for realizing some of the functions described above, or may be capable of realizing the functions described above in combination with a program already recorded in the computer system.

Although the example embodiments of the present invention have been described in detail above with reference to the drawings, the specific configuration is not limited to these example embodiments, and designs and the like not departing from the gist of the present invention are included.

INDUSTRIAL APPLICABILITY

Example embodiments of the present invention may be applied to a data classification system, a data classification method, and a recording medium.

DESCRIPTION OF THE REFERENCE SYMBOLS 101, 102, 501: Data classification system
111, 511: Known class likelihood calculation unit
112: Unknown class likelihood calculation unit
113, 513: All-class likelihood calculation unit
114, 512: Class candidate selection unit
115, 514: Class estimation unit
116: Model storage unit
117: Inter-class similarity calculation unit
121: Training data storage unit
122: Class attribute storage unit
123: Model generation unit

What is claimed is:

1. A data classification system comprising:
a memory configured to store instructions; and
a processor configured to execute the instructions to:
calculate, for each of a plurality of known classes that appear in training data on which a machine learning model is trained, a known class likelihood that target data belongs to the known class among all the known classes, using the machine learning model;
calculate, for each of a plurality of unknown classes that do not appear in the training data on which the machine learning model is trained, a similarity of each known class to the unknown class;
calculate, for each unknown class, an unknown class likelihood that the target data belongs to the unknown class among all the unknown classes, based on the known class likelihood and the similarity of each known class to the unknown class;
select, as a plurality of candidate classes, one or more of the known classes and one or more of the unknown classes based on the known class likelihood of each known class and the unknown class likelihood of each unknown class,
wherein the selected known classes are a first number of the known classes for which the known class likelihood is highest, or are the known classes for which the known class likelihood is greater than a first threshold, and
wherein the selected unknown classes are a second number of the unknown classes for which the unknown class likelihood is highest, or are the unknown classes for which the unknown class likelihood is greater than a second threshold;
calculate, for each candidate class, an all-class likelihood that the target data belongs to the candidate class among all the candidate classes; and
estimate the candidate class to which the target data belongs based on the all-class likelihood of each candidate class.

2. A data classification method comprising:
calculating, for each of a plurality of known classes that appear in training data on which a machine learning model is trained, a known class likelihood that target data belongs to the known class among all the known classes, using the machine learning model;
calculating, for each of a plurality of unknown classes that do not appear in the training data on which the machine learning model is trained, a similarity of each known class to the unknown class;
calculating, for each unknown class, an unknown class likelihood that the target data belongs to the unknown class among all the unknown classes, based on the known class likelihood and the similarity of each known class to the unknown class;
selecting, as a plurality of candidate classes, one or more of the known classes and one or more of the unknown classes based on the known class likelihood of each known class and the unknown class likelihood of each unknown class,
wherein the selected known classes are a first number of the known classes for which the known class likelihood is highest, or are the known classes for which the known class likelihood is greater than a first threshold, and
wherein the selected unknown classes are a second number of the unknown classes for which the unknown class likelihood is highest, or are the unknown classes for which the unknown class likelihood is greater than a second threshold;
calculating, for each candidate class, an all-class likelihood that the target data belongs to the candidate class among all the candidate classes; and
estimating the candidate class to which the target data belongs based on the all-class likelihood of each candidate class.

3. A non-transitory recording medium recording a program for causing a computer to execute:

calculating, for each of a plurality of known classes that appear in training data on which a machine learning model is trained, a known class likelihood that target data belongs to the known class among all the known classes, using the machine learning model;

calculating, for each of a plurality of unknown classes that do not appear in the training data on which the machine learning model is trained, a similarity of each known class to the unknown class;

calculating, for each unknown class, an unknown class likelihood that the target data belongs to the unknown class among all the unknown classes, based on the known class likelihood and the similarity of each known class to the unknown class;

selecting, as a plurality of candidate classes, one or more of the known classes and one or more of the unknown classes based on the known class likelihood of each known class and the unknown class likelihood of each unknown class, wherein the selected known classes are a first number of the known classes for which the known class likelihood is highest, or are the known classes for which the known class likelihood is greater than a first threshold, and wherein the selected unknown classes are a second number of the unknown classes for which the unknown class likelihood is highest or are the unknown classes for which the unknown class likelihood is greater than a second threshold;

calculating, for each candidate class, an all-class likelihood that the target data belongs to the candidate class among all the candidate classes; and estimating the candidate class to which the target data belongs based on the all-class likelihood of each candidate class.

\* \* \* \* \*